United States Patent [19]
Frankiewicz

[11] 3,923,394
[45] Dec. 2, 1975

[54] EXPOSURE APPARATUS FOR USE IN PHOTOGRAPHIC COPIERS

[75] Inventor: Gerhard Frankiewicz, Sauerlach, Germany

[73] Assignee: Agfa-Gevaert Aktiengesellschaft, Leverkusen, Germany

[22] Filed: Nov. 11, 1974

[21] Appl. No.: 522,932

[30] Foreign Application Priority Data
Nov. 13, 1973 Germany............................ 2356573

[52] U.S. Cl. ...................... 355/37; 355/30; 355/32; 355/70; 240/47; 240/41.35 A
[51] Int. Cl.².................... G03B 27/54; G03B 27/76
[58] Field of Search ............ 355/67, 70, 71, 37, 30, 355/32; 353/95, 98, 60, 61; 352/202, 203; 240/47, 41.35 A, 41.35 B

[56] References Cited
UNITED STATES PATENTS

| | | | |
|---|---|---|---|
| 3,222,985 | 12/1965 | Remesat | 240/47 X |
| 3,318,184 | 5/1967 | Jackson | 352/202 X |
| 3,488,117 | 1/1970 | Weiglass | 240/41.35 A |
| 3,492,070 | 1/1970 | Zahn | 355/37 |
| 3,626,176 | 12/1971 | Tsugami | 240/47 |

Primary Examiner—Robert P. Greiner
Attorney, Agent, or Firm—Michael S. Striker

[57] ABSTRACT

In a photographic copier, an exposure apparatus includes a plurality of elliptical dichroic reflectors, each having a respective first focal point and a respective second focal point, with the reflectors being so arranged that the second focal points are substantially coincident and form a common focus. There are provided a plurality of light sources, each located substantially coincident with the first focal point of a respective one of the elliptical reflectors. A light duct has a mirrored inner surface and has an inlet end arranged in the vicinity of the common focus. Light diffusing end portions close off the inlet end and the outlet end of the light duct. The negative through which diffused light is to be projected is located in a plane lying in the vicinity of the outlet end of the light duct.

11 Claims, 6 Drawing Figures

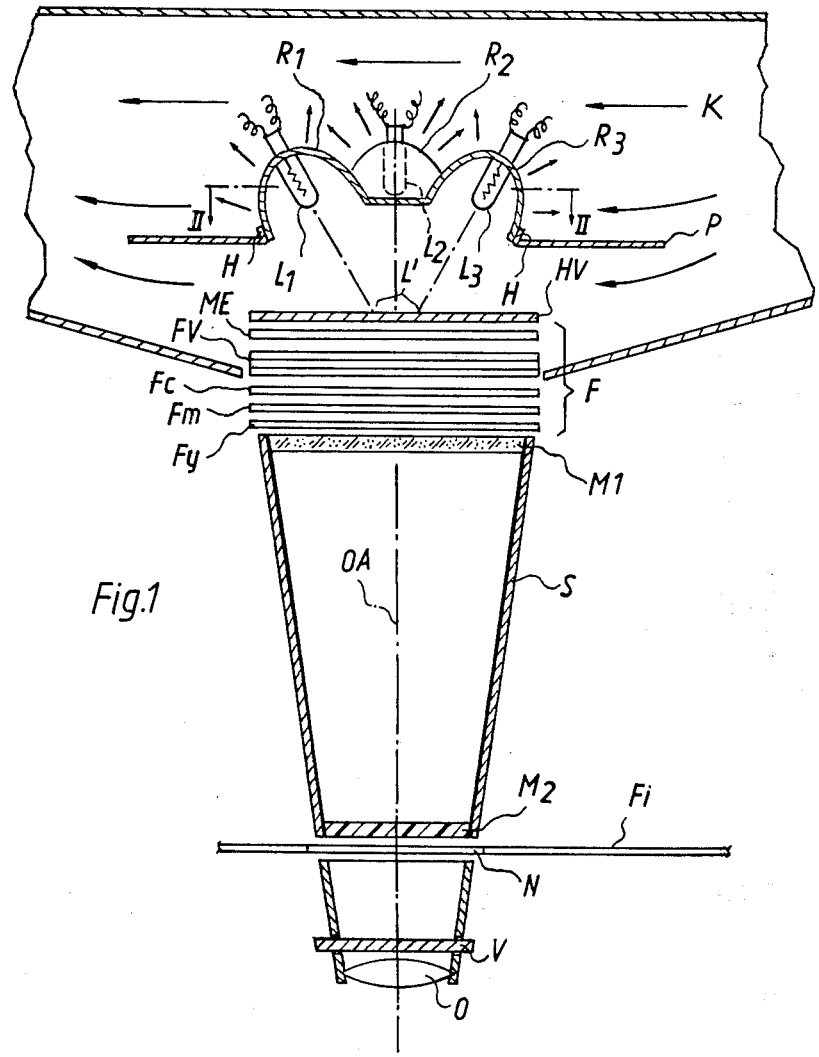
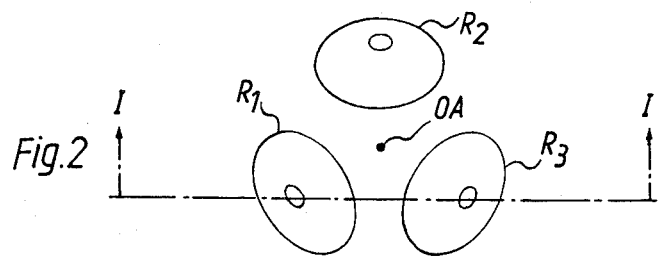

EXPOSURE APPARATUS FOR USE IN PHOTOGRAPHIC COPIERS

BACKGROUND OF THE INVENTION

The invention relates to an exposure apparatus for a photographic copying machine, in which light from several light sources is mixed and used to diffusely illuminate a negative.

An exposure apparatus of this type is known in which a plurality of double condensers are used and in which light from a plurality of light sources is directed onto a matte plate serving as a light mixer, with an additional double condenser being employed between the matte plate and the plane of the negative through which the mixed and diffused light is to be projected.

Apart from the relatively large dimensions inherent in the known construction, such a construction is unsuited for modern copying machines, because the use of numerous lenses places a limit upon the luminous flux employed relative to the solid angle used, and because the use of numerous lenses does not permit an increase of the power of the light sources because of the limited ability of the lenses to withstand thermal stress. Apart from the low efficiency of the known condenser system, parallel or directed light is undesirable for copying processes, due to the formation on the positive of sharp images resulting from cracks or dust particles on the negative.

SUMMARY OF THE INVENTION

It is a general object of the invention to provide an exposure apparatus for the diffuse illumination of a negative, of the general type discussed above, so designed that the generated luminous flux is utilized with high efficiency, and so designed that the apparatus can be safely subjected to high thermal stresses, thereby permitting substantial increases in the power consumption of the light sources. Additionally, it is desired that adjustments of the apparatus and maintenance be made as simple as possible.

These objects, and others which will become more understandable from the description, below, of preferred embodiments, can be met, according to one advantageous concept of the invention, by arranging each light source employed in the focal point of a respective elliptic dichroic reflector, with the respective second focal points of the reflectors being generally coincident and accordingly forming a common focus, with such common focus lying at the inlet of a mirrored light duct having an end surface which scatters and diffuses light passing through the mirrored light duct, with the plane of the negative to be illuminated lying in the vicinity of the outlet of the mirrored light duct. The use of reflectors makes unnecessary the use of lenses. The dichroic reflectors, in per se known manner, transmit the infrared component of the incident incandescent-bulb light, while reflecting substantially only the visible component of such incident light.

In the case of subtractive copiers, it is advantageous to arrange at the inlet of the mirrored light duct a stack of color filters of the respective subtractive primary colors.

In the case of additive copiers, on the other hand, it is contemplated according to the invention to arrange, intermediate the two focal points of the individual reflectors, multi-hole apertured plates, color filters and separately controllable shutters.

With apparatuses of the type discussed above, the inventive expedient brings the advantage that, if one of the lamps of the apparatus becomes inoperative, the apparatus can nevertheless continue to be used without interruption, although of course with a lowered light power.

Both of the constructions adapted for the additive printing process and for those adapted for the subtractive printing process, it is advantageous to arrange a coarse filter or prefilter unit back of the color filters. The mirrored light duct serving for the uniform mixing of the color components is closed off at both ends by matte plates which diffusely scatter light. The inventive arrangement of the light sources is advantageously cooled by means of a cooling arrangement generating a divided stream of cooling air for the back sides of the reflectors and for the filters.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS:

FIG. 1 is a section through an exposure apparatus adapted for a subtractive printing process;

FIG. 2 is a section taken on line II—II of FIG. 1;

DESCRIPTION OF THE PREFERRED EMBODIMENTS

The inventive exposure apparatus shown in FIG. 1 is comprised of three elliptic reflectors $R_1$, $R_2$, $R_3$ arranged substantially symmetrically around the optical axis OA of the exposure apparatus. The exposure apparatus further includes the three light sources $L_1$, $L_2$, $L_3$, a set of filters F, a shutter V, a mirrored light duct S having its ends closed off by matte plates $M_1$ and $M_2$, an optical enlarger O, and the negative N.

The light sources $L_1$, $L_2$, $L_3$ are located coincident with respective first foci of the elliptical reflectors $R_1$, $R_2$, $R_3$. The major axes of the reflectors are so inclined relative to the optical axis OA that their respective second foci all fall within a relatively small region $L'$ located in the vicinity of the optical axis.

Approximately in the plane which includes the lamp images at $L'$ and which is normal to the optical axis OA, there is positioned a prefilter or coarse filter unit $F_v$, a set of subtractive color filters $F_c$, $F_m$, $F_y$ adjustable in their action, and a mask equivalent filter ME. The adjustment of filter density is performed in per se known manner, and need not be explained here. The duration of the exposure can be controlled by means of the shutter V, provided at a suitable place in the path of travel of the light. Additionally arranged in the path of light travel is an auxiliary shutter HV.

This filter arrangement and the matte plate $M_1$ are located at the inlet end of the mirrored light duct S, in which the light is so mixed as to produce upon the outlet matte plate $M_2$ of the mirrored light duct a completely uniform light intensity.

The film Fi is movably arranged in the negative plane N and in per se known manner is projected onto a (non-illustrated) light-sensitive material through an objective 0.

The reflectors $R_1$, $R_2$, $R_3$ and the associated lamps $L_1$, $L_2$, $L_3$, as shown in FIG. 2, are arranged around the optical axis OA spaced apart circumferentially by angles of about 120°. The surface coatings of the reflectors are such that the infrared component of the light from lamps $L_1$, $L_2$, $l_3$ is transmitted and the visible component reflected. Preferably, ordinary commercially available halogen lamps with cemented-on reflectors are used.

A plate member P separates the lamp housing into upper and lower portions. The reflectors are secured to this plate member P with holding portions H in a readily removable and interchangeable manner. The stream of cooling air K produced by a non-illustrated blower is split into two streams, of which one sweeps over the back sides of the reflectors, and of which the other sweeps across the front sides of the reflectors and across the filters. Care is taken to assure that the bulb temperature requisite for trouble-free operation of the halogen lamps is maintained.

Figure 3:
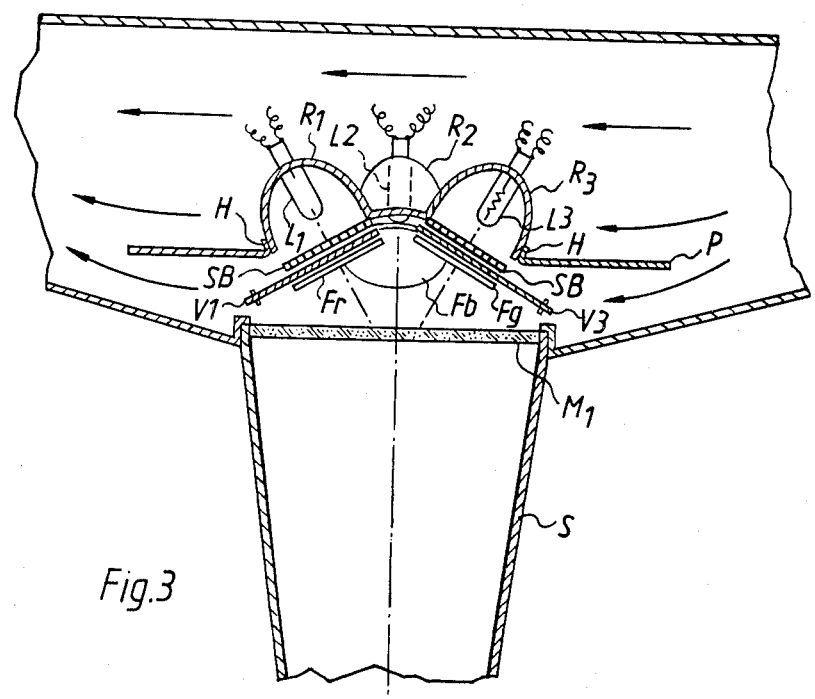
FIG. 3 is a section through an exposure apparatus adapted for an additive printing process.

FIG. 3 depicts a section through an inventive exposure apparatus adapted for an additive printing process. The exposure apparatus is in principle the same as that already described; however, each lamp now has an associated multi-hole aperture plate SB and a respective additive primary color filter $F_r$, $F_b$, $F_g$, as well as a respective shutter $V_1$, $V_2$, $V_3$. By separately controlling the three shutters and different exposure times for the three primary colors, it is possible in per se known manner to control the copying light in a manner analogous to the variation of the filtering action that is employed with the subtractive printing process.

Figures 4A, 4B, 4C:
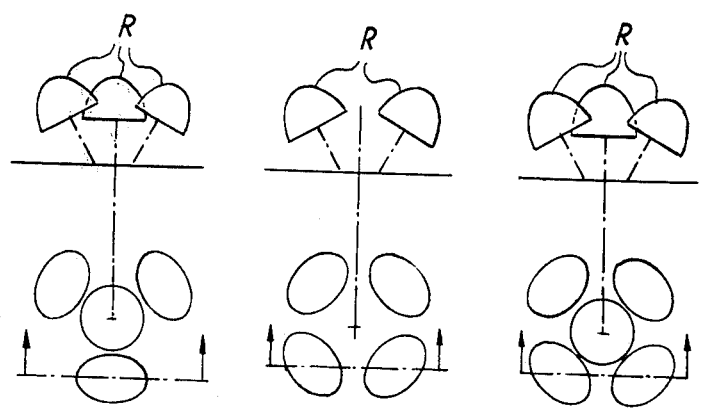
FIGS. 4a–4c schematically depict different arrangements of reflectors which can be employed in an exposure apparatus adapted for a subtractive printing process.

With the additive apparatus, three lamps or else six lamps arranged in three pairs are used. With the substractive control expedient, to increase the light intensity it would likewise be possible to employ a cluster of for example four or five lamps. Different such arrangements are schematically depicted in FIGS. 4a, 4b and 4c. In the arrangements of FIGS. 4a and 4c, a lamp is arranged coincident with the optical axis of the apparatus.

If a lamp becomes inoperative, the copier can continue to be operated until such time as a lamp replacement can be conveniently performed, although at a lower operating speed, the speed being automatically reduced by means of the electronic control arrangement of the exposure apparatus. This is possible because the light travelling through the mirrored light chute, despite the disturbed symmetry of the illumination is mixed with sufficient uniformity. This is likewise possible for additive exposure apparatuses according to the invention, when the lamps are arranged in three pairs, instead of the three single lamps shown in FIG. 3.

The set of filters employed with the subtractive arrangement can also be arranged in the immediate vicinity of the objective. Additionally, instead of the illustrated prismatic or pyramidal form of the mirrored light duct, a parabolic or elliptical light duct can be employed, with the symmetry axis of such light duct corresponding to the optical axis of the exposure apparatus.

It will be understood that each of the elements described above, or two or more together, may also find a useful application in other types of constructions differing from the types described above.

While the invention has been illustrated and described as embodied in exposure apparatuses for three-color additive and subtractive printing arrangements, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention.

What is claimed as new and desired to be protected by Letters Patent is:

1. In a photographic copier, an exposure apparatus, comprising, in combination, a plurality of elliptical reflectors, each having a respective first focal point and a respective second focal point, with said reflectors being so arranged that said second focal points are substantially coincident and form a common focus; a plurality of light sources, each located substantially coincident with the first focal point of a respective one of said plurality of elliptical reflectors; a light duct having a mirrored inner surface and having an inlet end arranged in the vicinity of said common focus and having an outlet end; light diffusing end portions closing off said inlet end and said outlet end of said light duct; and means defining a negative plane in which a negative to be illuminated by said exposure apparatus is to be located, said negative plane lying in the vicinity of said outlet end of said light duct.

2. In a photographic copier as defined in claim 1, wherein said elliptical reflectors are dichroic reflectors.

3. In a photographic copier as defined in claim 1, wherein said exposure apparatus further includes subtractive primary color filters arranged one behind the other at the inlet end of said light duct.

4. In a photographic copier as defined in claim 1, wherein said exposure apparatus further includes intermediate the two focal points of each of said reflectors a respective multi-hole aperture plate, a respective color filter and a respective separately controllable shutter.

5. In a photographic copier as defined in claim 4, wherein said plurality of light sources includes three light sources, and wherein said plurality of reflectors includes three reflectors cooperating with said three light sources, and wherein said color filters are of the respective additive primary colors.

6. In a photographic copier as defined in claim 3, and further including a coarse filter unit arranged intermediate said light sources and said subtractive primary color filters.

7. In a photographic copier as defined in claim 4, and further including intermediate the first focal point of each of said reflectors and the respective color filter a respective coarse filter unit.

8. In a photographic copier as defined in claim 1, wherein the one of said light diffusing end portions which closes off said inlet end of said light duct is a matte plate.

9. In a photographic copier as defined in claim 3, wherein said reflectors are dichroic reflectors, and wherein said exposure apparatus further includes means for establishing a first stream of cooling air flowing across the back sides of said elliptical dichroic reflectors and a second stream of cooling air flowing across the front sides of said reflectors and across said filters.

10. in a photographic copier as defined in claim 4, wherein said reflectors are dichroic reflectors, and wherein said exposure apparatus further includes means for establishing a first stream of cooling air flowing across the back sides of said elliptical dichroic reflectors and a second stream of cooling air flowing across the front sides of said reflectors and said filters.

11. In a photographic copier as defined in claim 1, wherein said elliptical reflectors are dichroic reflectors which transmit the infrared component of the light emitted from said light sources while reflecting the visible component of the light emitted from said light sources.

* * * * *